United States Patent
Ayub et al.

(10) Patent No.: US 10,445,100 B2
(45) Date of Patent: Oct. 15, 2019

(54) BROADCASTING MESSAGES BETWEEN EXECUTION SLICES FOR ISSUED INSTRUCTIONS INDICATING WHEN EXECUTION RESULTS ARE READY

(71) Applicant: International Business Machines Corporation, Armonk, NY (US)

(72) Inventors: Salma Ayub, Austin, TX (US); Joshua W. Bowman, Austin, TX (US); Jeffrey C. Brownscheidle, Seattle, WA (US); Sundeep Chadha, Austin, TX (US); Dhivya Jeganathan, Austin, TX (US); Dung Q. Nguyen, Austin, TX (US); Salim A. Shah, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 15/177,394

(22) Filed: Jun. 9, 2016

(65) Prior Publication Data
US 2017/0357513 A1    Dec. 14, 2017

(51) Int. Cl.
*G06F 9/38*    (2018.01)
(52) U.S. Cl.
CPC .......... *G06F 9/3828* (2013.01); *G06F 9/3836* (2013.01); *G06F 9/3838* (2013.01); *G06F 9/3891* (2013.01)
(58) Field of Classification Search
CPC .............................. G06F 9/3828; G06F 9/3836
See application file for complete search history.

(56) References Cited

U.S. PATENT DOCUMENTS

| | | | | |
|---|---|---|---|---|
| 5,708,788 A | * | 1/1998 | Katsuno | G06F 9/321 712/214 |
| 8,051,275 B2 | * | 11/2011 | Williamson | G06F 9/3836 712/214 |
| 8,693,380 B2 | | 4/2014 | He et al. | |

(Continued)

FOREIGN PATENT DOCUMENTS

CN    104503838 A    4/2015

OTHER PUBLICATIONS

Cohen et al., "An Optimal Wake-Up Scheduling Algorithm for Minimizing Energy Consumption While Limiting Maximum Delay in a Mesh Sensor Network", IEEE/ACM Transactions on Networking (TON) (online), vol. 17, Issue 2, dated Apr. 2009, pp. 570-581, IEEE Press, Piscataway, DOI: 10.1109/TNET.2009.2014656.

(Continued)

*Primary Examiner* — Jacob Petranek
(74) *Attorney, Agent, or Firm* — Nathan M. Rau

(57) ABSTRACT

Methods and apparatus for transmitting data between execution slices of a multi-slice processor including receiving, by an execution slice, a broadcast message comprising an instruction tag (ITAG) for a producer instruction, a latency, and a source identifier; determining that an issue queue in the execution slice comprises an ITAG for a consumer instruction, wherein the consumer instruction depends on result data from the producer instruction; calculating a cycle countdown using the latency and the source identifier; determining that the cycle countdown has expired; and in response to determining that the cycle countdown has expired, reading the result data from the producer instruction.

17 Claims, 5 Drawing Sheets

(56) References Cited

U.S. PATENT DOCUMENTS

| | | | |
|---|---|---|---|
| 8,918,784 B1 | 12/2014 | Jorgensen et al. | |
| 9,207,753 B2 | 12/2015 | Vash et al. | |
| 9,207,943 B2 | 12/2015 | Plondke et al. | |
| 2007/0204135 A1* | 8/2007 | Jiang | G06F 9/3824 712/214 |
| 2009/0113182 A1* | 4/2009 | Abernathy | G06F 9/3836 712/216 |
| 2010/0250900 A1* | 9/2010 | Brown | G06F 9/3814 712/208 |
| 2010/0332804 A1* | 12/2010 | Golla | G06F 9/3838 712/214 |
| 2013/0117543 A1* | 5/2013 | Venkataramanan | G06F 9/382 712/220 |
| 2015/0081921 A1 | 3/2015 | Cherukuri et al. | |
| 2015/0277916 A1 | 10/2015 | Khartikov et al. | |
| 2016/0371091 A1* | 12/2016 | Brownscheidle | G06F 9/3836 |

OTHER PUBLICATIONS

Sun et al., "DW-MAC: A Low Latency, Energy Efficient Demand-Wakeup MAC Protocol for Wireless Sensor Networks", MobiHoc '08 Proceedings of the $9^{th}$ ACM International Symposium on Mobile ad hoc Networking and Computing, dated May 2008, pp. 53-62, ACM, New York, ISBN: 978-1-60558-073-9, DOI: 10.1145/1374618.1374627.

* cited by examiner

BROADCASTING MESSAGES BETWEEN EXECUTION SLICES FOR ISSUED INSTRUCTIONS INDICATING WHEN EXECUTION RESULTS ARE READY

BACKGROUND

Field of the Invention

The field of the invention is data processing, or, more specifically, methods, apparatus, and products for transmitting data between execution slices of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for transmitting data between execution slices of a multi-slice processor. Transmitting data between execution slices of a multi-slice processor includes receiving, by an execution slice, a broadcast message comprising an instruction tag (ITAG) for a producer instruction, a latency, and a source identifier; determining that an issue queue in the execution slice comprises an ITAG for a consumer instruction, wherein the consumer instruction depends on result data from the producer instruction; calculating a cycle countdown using the latency and the source identifier; determining that the cycle countdown has expired; and in response to determining that the cycle countdown has expired, reading the result data from the producer instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
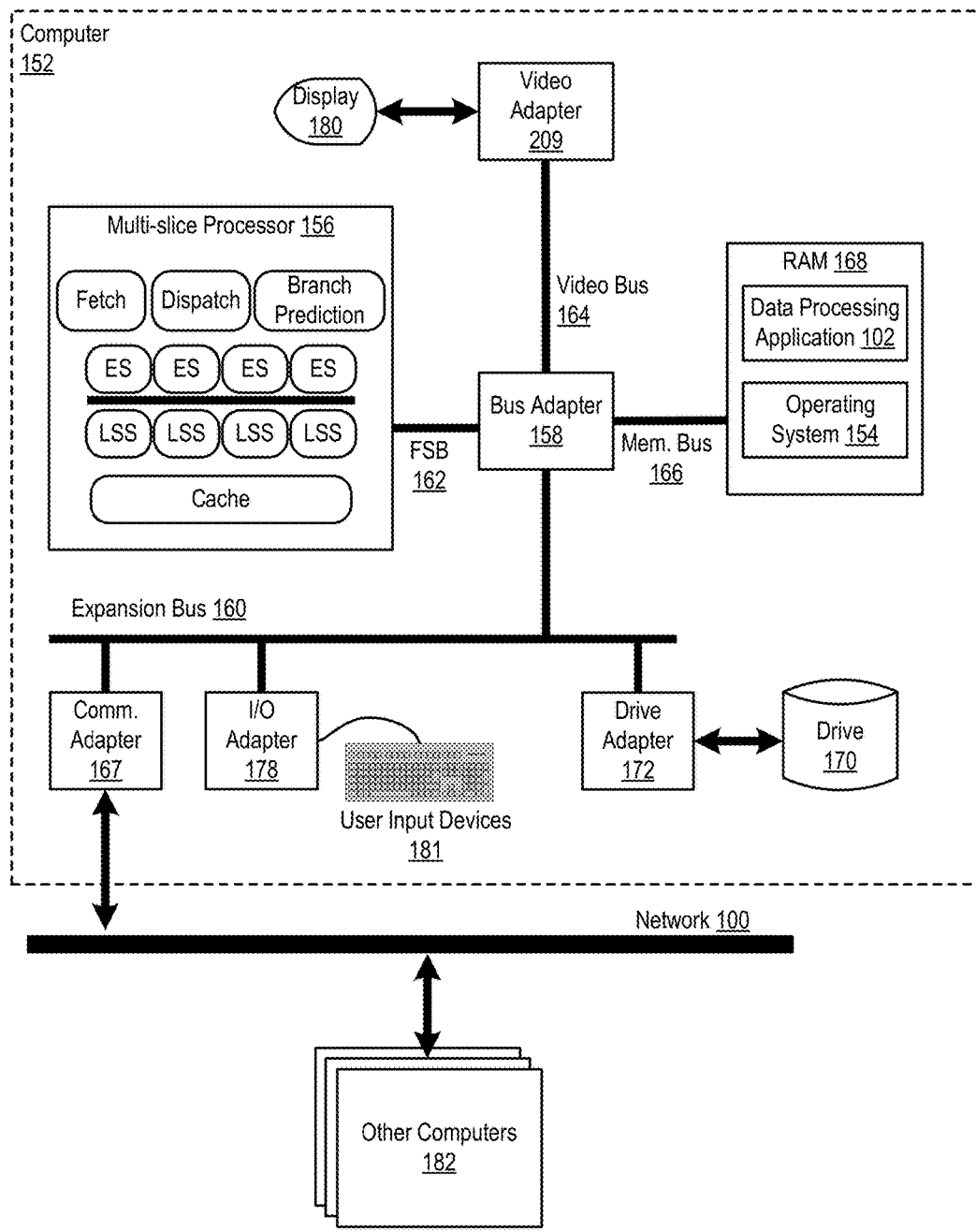
FIG. 1 sets forth a block diagram of an example system configured for transmitting data between execution slices of a multi-slice processor according to embodiments of the present invention.

Exemplary methods and apparatus for transmitting data between execution slices of a multi-slice processor in accordance with the present invention are described with reference to the accompanying drawings, beginning with FIG. 1. FIG. 1 sets forth a block diagram of an example system configured for transmitting data between execution slices of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
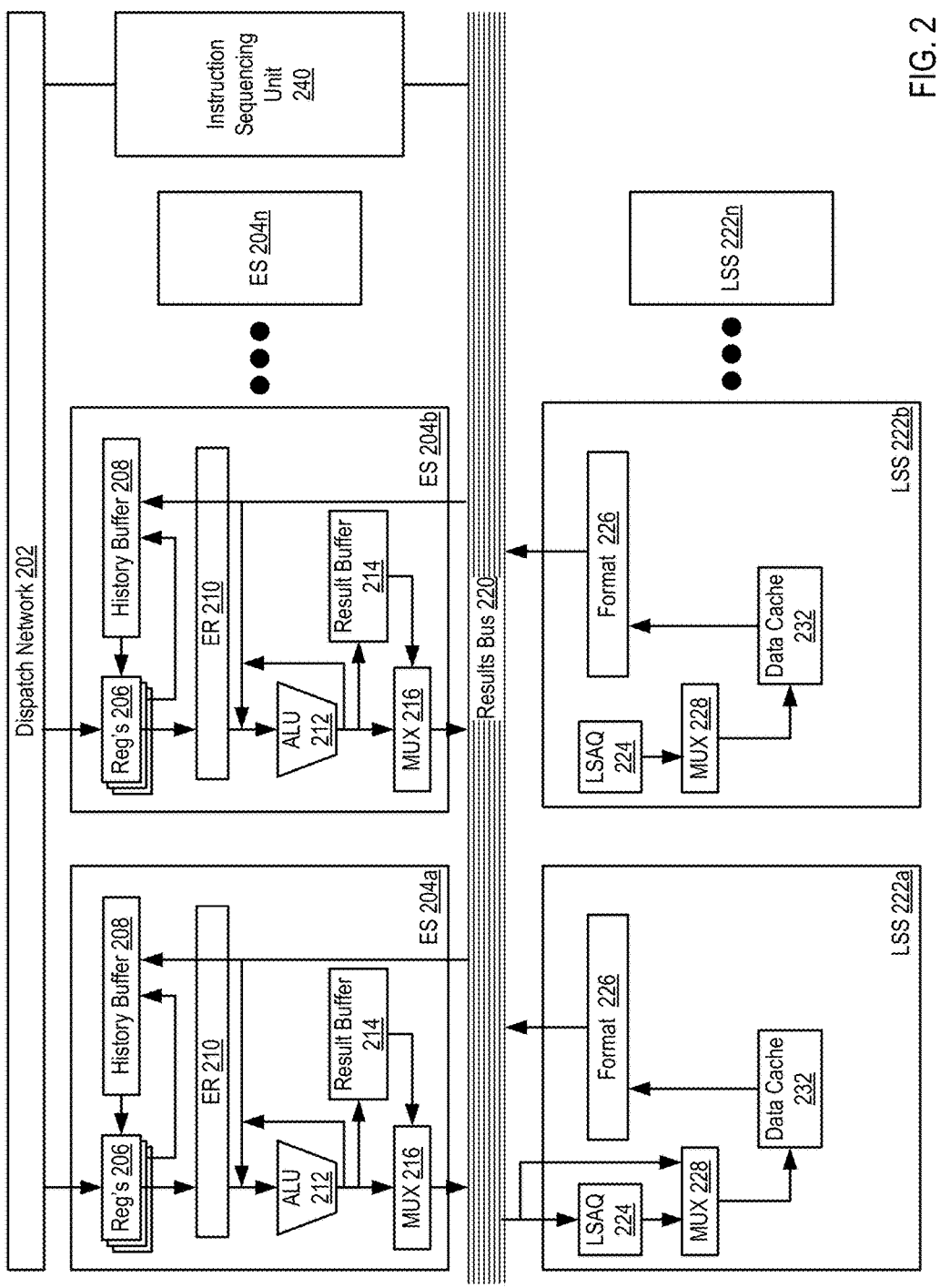
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load/store slice (222a, 222b, 222c) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), and formatting logic (226), among other components described below with regard to FIG. 3. The queue receives load and store operations to be carried out by the load/store slice (222). The formatting logic (226) formats data into a form that may be returned on the results bus (220) to an execution slice as a result of a load or store instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted as a single unit, each of the plurality of execution slices may include a respective instruction sequencing unit similar to instruction sequencing unit (240). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions as determined by an ITAG. Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
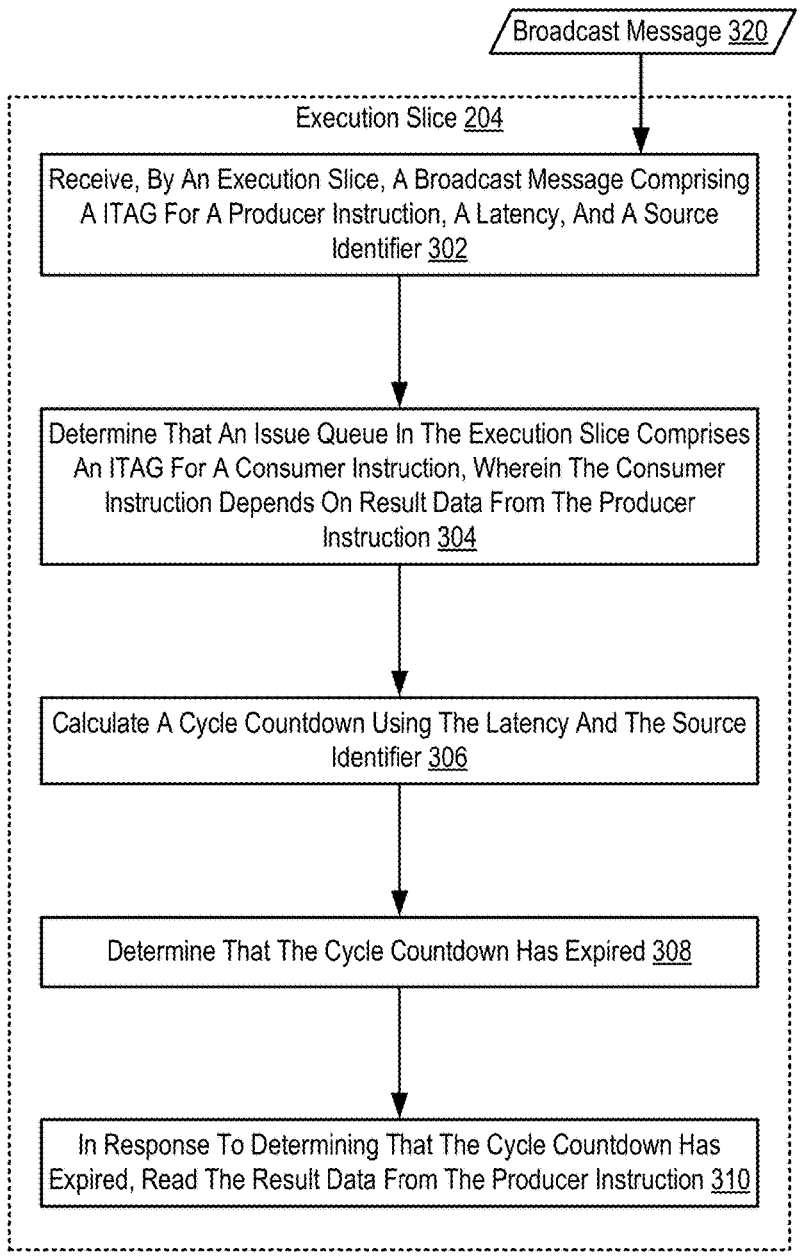
FIG. 3 sets forth a flow chart illustrating an exemplary method transmitting data between execution slices of a multi-slice processor according to embodiments of the present invention.

For further explanation, FIG. 3 sets forth a flow chart illustrating an exemplary method for transmitting data between execution slices of a multi-slice processor. The method of FIG. 3 may be carried out by a multi-slice processor similar to that in the examples of FIGS. 1 and 2. The method of FIG. 3 includes receiving (302), by an execution slice (204), a broadcast message (320) comprising an instruction tag (ITAG) for a producer instruction, a latency, and a source identifier. Receiving (302), by an execution slice (204), a broadcast message (320) comprising a ITAG for a producer instruction, a latency, and a source identifier may be carried out by a source execution slice transmitting the broadcast message to other execution slices, including the receiving execution slice.

A broadcast message is a message transmitted by a source execution slice to notify other elements within the multi-slice processor that a producer instruction is beginning execution. Specifically, a broadcast message may notify elements within the multi-slice processor that result data from a producer instruction will soon be available for use by consumer instructions. The broadcast message does not include the result data.

The producer instruction and the consumer instruction are tracked using ITAGs. An ITAG is an instruction identifier. Each ITAG tracks an internal operation from decode to completion. Each internal operation may be assigned an ITAG by an ITAG assignment unit, which assigns ITAGs sequentially to internal operations before the internal operations are transmitted to a dispatch unit. Internal operations are the result of decoding processor instructions, and each internal operation is tracked using an ITAG. Processor instructions may be decoded into a single internal operation or may be decoded into a plurality of internal operations.

A producer instruction is an internal operation that is executed by a source execution slice to generate result data. A consumer instruction (also referred to as a source instruction) is an internal operation that may use the result data as input for execution. For example, a producer instruction may be "A+B=C". The result data "C" may be used as input for the consumer instruction "C+D=E".

The broadcast message may also include a latency. The latency is a prediction of the amount of time (e.g., measured in cycles) required for the source execution slice to execute the producer instruction and generate the result data. The latency is determined by the source execution slice based on the type of instruction to be executed. For example, an ADD internal operation may require one cycle to generate result data, and a MULTIPLY internal operation may require six cycles to generate the result data. The latency may not include the time (i.e., number of cycles) necessary to transmit the result data to other execution slices (e.g., via a result bus).

The broadcast message may also include a source identifier. A source identifier identifies the sender of the broadcast message. The source identifier may be an address of the source executing slice that has broadcasted the broadcast message. The source identifier may be numerical or alphanumeric text. For example, the broadcast message may include a source identifier of "1" for a broadcast message transmitted to other execution slices identified as "2", "3", and "4".

The method of FIG. 3 also includes determining (304) that an issue queue in the execution slice (204) comprises an ITAG for a consumer instruction, wherein the consumer instruction depends on result data from the producer instruction. Determining (304) that an issue queue in the execution slice (204) comprises an ITAG for a consumer instruction, wherein the consumer instruction depends on result data from the producer instruction may be carried out by comparing the ITAG of the producer instruction to a list of ITAGs for producer instructions upon which each consumer instruction in the issue queue depends.

Entries in the issue queue for the consumer instruction may include a list of ITAGs for producer instructions upon which each consumer instruction depends. Determining (304) that an issue queue in the execution slice (204) comprises an ITAG for a consumer instruction may include comparing the ITAG for the producer instruction received in the broadcast message to the ITAGs for the producer instructions stored in the issue queue. Determining (304) that an issue queue in the execution slice (204) comprises an ITAG for a consumer instruction may further include determining that the received ITAG matches one of the ITAGs for producer instructions stored in the issue queue with the consumer instruction.

For example, the issue queue may have an entry for a particular consumer instruction that includes three producer instruction ITAGs (e.g., ITAGs "14", "35", and "66"). The execution slice may receive a broadcast message that includes the ITAG "35". The execution slice may compare the "35" ITAG to each producer instruction ITAG for each consumer instruction stored in the issue queue, and determine that the entry for the particular consumer instruction includes the ITAG "35" and therefore is dependent upon the result data from the producer instruction for ITAG "35".

The method of FIG. 3 also includes calculating (306) a cycle countdown using the latency and the source identifier. Calculating (306) a cycle countdown using the latency and the source identifier may be carried out by the execution slice hosting the consumer instruction. The cycle countdown is a prediction of the amount of time (e.g., measured in cycles) after which the result data will be available for reading by the execution slice hosting the consumer instruction. The cycle countdown includes both the latency (time required to generate the result data by the source execution slice) and the amount of time the results data takes to travel from the source execution slice to the execution slice hosting the consumer instruction. The cycle countdown may be stored in the issue queue entry for the associated consumer instruction.

For example, a producer instruction may have a latency of one cycle and the result data may take three cycles to travel from the source execution slice to the execution slice hosting the consumer instruction. Therefore, the cycle countdown may be calculated as four cycles. The cycle countdown may be calculated using other additional information and may be adjusted dynamically as new information is received by the execution slice. For example, if calculating the cycle countdown takes one cycle, the cycle countdown may be adjusted by one cycle to account for the calculation time.

The method of FIG. 3 also includes determining (308) that the cycle countdown has expired. Determining (308) that the cycle countdown has expired may be carried out by initiating the countdown procedure and monitoring the countdown procedure at each cycle to determine whether the cycle countdown has expired. Initiating the countdown procedure may include decrementing the cycle countdown at each time or cycle interval. For example, for a cycle countdown value of four cycles, each cycle the cycle countdown value may be decremented by one cycle. After four cycles, the cycle countdown will be decremented to zero, and the execution slice may then determine that the cycle countdown has expired.

The method of FIG. 3 also includes, in response to determining that the cycle countdown has expired, reading (310) the result data from the producer instruction. Reading (310) the result data from the producer instruction may be carried out by preparing elements within the execution slice to receive the result data. Reading (310) the result data from the producer instruction may also be carried out by accessing a location or medium upon which the results data has been placed or stored.

For example, the results data may be stored by the source execution slice in a storage location accessible by other execution slices. Alternatively, the results data may be transmitted on a bus to each execution slice at which point each execution slice reads the results data from the bus.

The result data may be read after the expiration of the cycle countdown because the results data may not be available before the expiration of the cycle countdown. Further, the result data may only be available for reading during a short period of time or number of cycles, and therefore the result data may need to be read during a narrow window of time (e.g., during a single, specific cycle).

Figure 4:
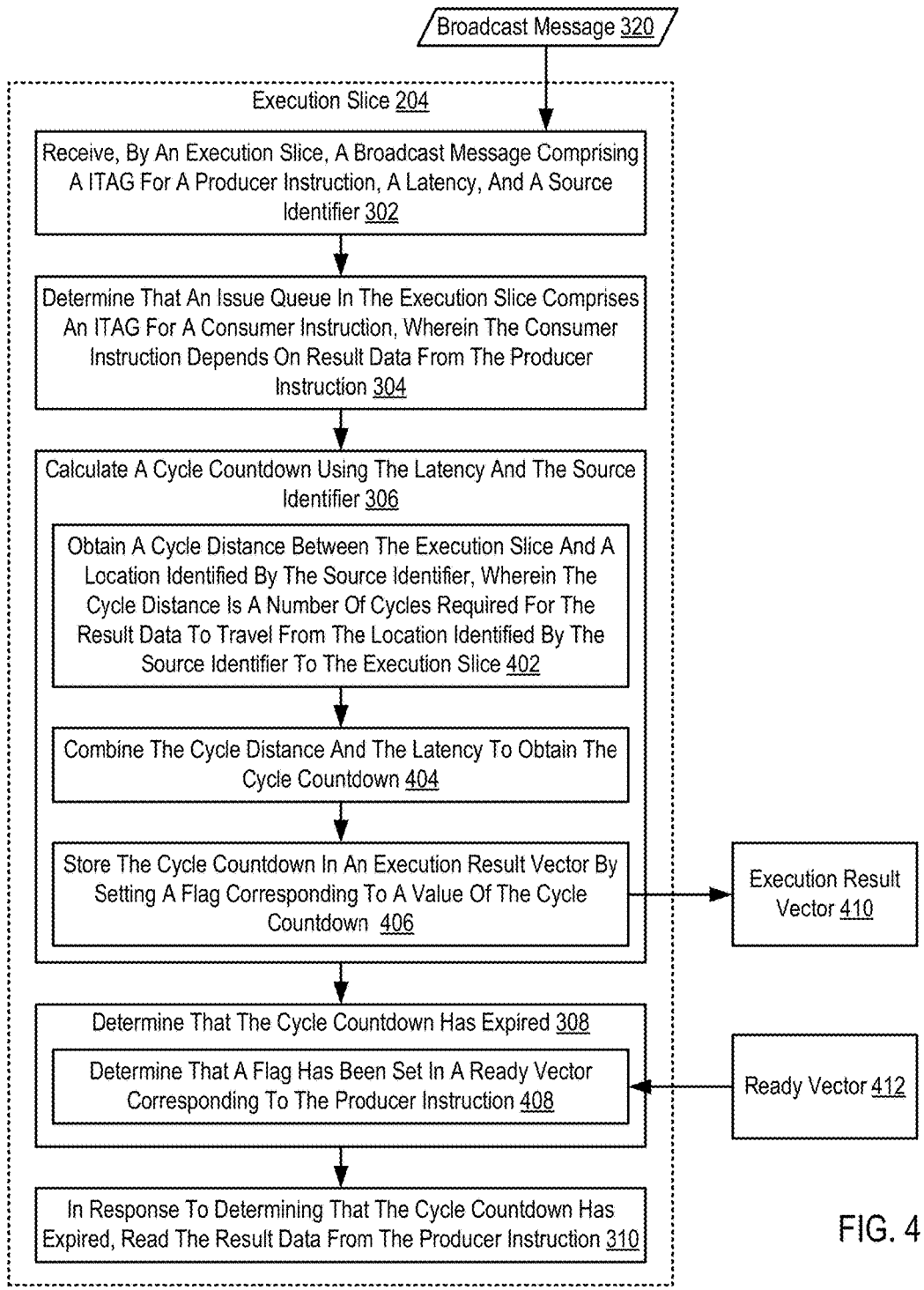
FIG. 4 sets forth a flow chart illustrating an exemplary method for transmitting data between execution slices of a multi-slice processor according to embodiments of the present invention.

For further explanation, FIG. 4 sets forth a flow chart illustrating an exemplary method for transmitting data between execution slices of a multi-slice processor according to embodiments of the present invention that includes receiving (302), by an execution slice (204), a broadcast message (320) comprising a ITAG for a producer instruction, a latency, and a source identifier; determining (304) that an issue queue in the execution slice (204) comprises an ITAG for a consumer instruction, wherein the consumer instruction depends on result data from the producer instruction; calculating (306) a cycle countdown using the latency and the source identifier; determining (308) that the cycle countdown has expired; and in response to determining that the cycle countdown has expired, reading (310) the result data from the producer instruction.

The method of FIG. 4 differs from the method of FIG. 3, however, in that calculating (306) a cycle countdown using the latency and the source identifier includes obtaining (402) a cycle distance between the execution slice (204) and a location identified by the source identifier, wherein the cycle distance is a number of cycles required for the result data to travel from the location identified by the source identifier to the execution slice (204); combining (404) the cycle distance and the latency to obtain the cycle countdown; and storing (406) the cycle countdown in an execution result vector (410) by setting a flag corresponding to a value of the cycle countdown.

Obtaining (402) a cycle distance between the execution slice (204) and a location identified by the source identifier, wherein the cycle distance is a number of cycles required for the result data to travel from the location identified by the source identifier to the execution slice (204) may be carried out by retrieving a stored value representing the cycle distance. A cycle distance is the number of cycles required for the result data to travel from the source execution slice to the execution slice hosting the consumer instruction. The cycle distance may be pre-stored in a location on the execution slice (i.e., hard-coded) and keyed to the associated source execution slice. For example, an execution slice may perform a lookup on a table using the source identifier to retrieve a cycle distance for the execution slice identified by the source identifier.

Obtaining (402) a cycle distance between the execution slice (204) and a location identified by the source identifier, wherein the cycle distance is a number of cycles required for the result data to travel from the location identified by the source identifier to the execution slice (204) may also be carried out by calculating the cycle distance as needed. For example, the execution slice hosting the consumer instruction may divide a known physical distance between itself and the source execution slice by the distance the result data is able to traverse each cycle.

Combining (404) the cycle distance and the latency to obtain the cycle countdown may be carried out by adding the cycle distance to the latency received in the broadcast message to obtain the total cycles that must pass before the result data is able to be read. For example, if the latency is six cycles (i.e., the producer instruction requires six cycles to execute on the source execution slice), and the cycle distance between the source execution slice and the execution slice hosting the consumer instruction is eight cycles, then the six cycles may be added to the eight cycles to obtain a cycle countdown of 14 cycles. As discussed above, the cycle countdown may be further altered based on other factors.

Storing (406) the cycle countdown in an execution result vector (410) by setting a flag corresponding to a value of the cycle countdown may be carried out by accessing the execution result vector. The execution result vector is a collection of elements, and each element may have a flag. Each element in the execution result vector may correspond to a cycle countdown value. For example, the first element in the execution result vector may correspond to one cycle remaining in the countdown cycle, the second element may correspond to two cycles remaining in the countdown cycle, etc. Storing (406) the cycle countdown in the execution result vector (410) may be carried out by setting a flag in an element of the execution result vector (410) corresponding to the value of the cycle countdown. For example, the execution result vector (410) for a consumer instruction may be a set of ten bits (e.g., "0000000000"). The rightmost bit may represent one remaining cycle in the cycle countdown, and the tenth bit may represent ten remaining cycles in the cycle countdown.

Storing (406) the cycle countdown value in the execution result vector (410) may include altering the bit corresponding to the cycle countdown value. For example, a cycle countdown value of seven may be stored as "0001000000". The issue queue may include an execution result vector (410) for each consumer instruction stored within the issue queue. Further, the execution result vector (410) may be stored at the entry for the corresponding consumer instruction.

The cycle countdown procedure may include decrementing the execution result vector (410) each cycle by altering the location of the flag corresponding to the value of the cycle countdown. For example, the flag set within execution result vector (410) may be moved (i.e., erased and a new flag set elsewhere) each cycle to track the current state or value of the cycle countdown. For example, during cycle 0, the execution result vector (410) may be stored as "0001000000" for a cycle countdown value of 7 cycles. During cycle 1, the execution result vector (410) may be altered to represent a new cycle countdown value of 6 cycles by storing the execution result vector (410) as "0000100000". During cycle 2, the execution result vector (410) may be altered to represent a new cycle countdown value of 5 cycles by storing the execution result vector (410) as "0000010000". The cycle countdown procedure may be initiated in response to the initial storing of the cycle countdown value in the execution result vector (410).

The method of FIG. 4 also differs from the method of FIG. 3 in that determining (308) that the cycle countdown has expired includes determining (408) that a flag has been set in a ready vector (412) corresponding to the producer instruction. Determining (408) that a flag has been set in a ready vector (412) corresponding to the producer instruction may be carried out by reading an element corresponding to the producer instruction and determining whether the flag within the element has been set.

A ready vector (412) is a collection of elements, and each element may correspond to a producer instruction that provides result data for a consumer instruction stored in the issue queue. Each element may also have a flag. Once the cycle countdown procedure reaches a point where the element corresponding to a cycle countdown value of 1, during the next cycle, the flag for the element corresponding to that producer instruction in a ready vector may be set.

Continuing with the example above, during cycle 6, the execution result vector (410) may be altered to represent a new cycle countdown value of 1 cycles by storing the execution result vector (410) as "0000000001". During cycle 7, the execution slice may read the execution result vector (410) and determine that the cycle countdown procedure has completed and set a flag for the element corresponding to the producer instruction in the ready vector (412). Setting the flag in the ready vector (412) may indicate that the result data should be read during the current cycle.

Figure 5:
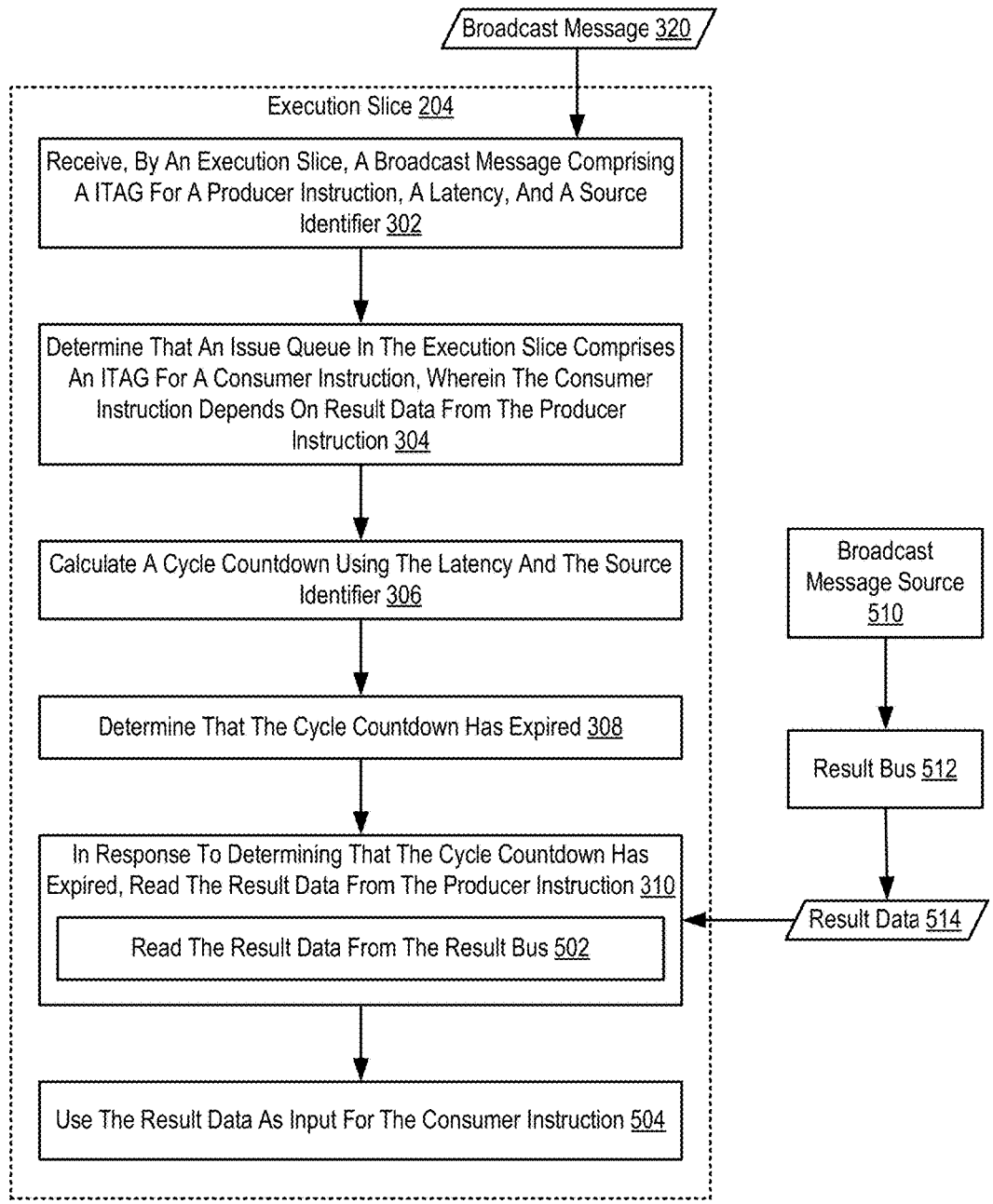
FIG. 5 sets forth a flow chart illustrating an exemplary method for transmitting data between execution slices of a multi-slice processor according to embodiments of the present invention.

For further explanation, FIG. 5 sets forth a flow chart illustrating an exemplary method for transmitting data between execution slices of a multi-slice processor according to embodiments of the present invention that includes receiving (302), by an execution slice (204), a broadcast message (320) comprising a ITAG for a producer instruction, a latency, and a source identifier; determining (304) that an issue queue in the execution slice (204) comprises an ITAG for a consumer instruction, wherein the consumer instruction depends on result data from the producer instruction; calculating (306) a cycle countdown using the latency and the source identifier; determining (308) that the cycle countdown has expired; and in response to determining that the cycle countdown has expired, reading (310) the result data from the producer instruction.

The method of FIG. 5 differs from the method of FIG. 3, however, in that reading (310) the result data (514) from the producer instruction includes reading (502) the result data (514) from the result bus (512). Reading (502) the result data (514) from the result bus (512) may be carried out by the broadcast message source (510) (such as the source execution slice) transmitting the result data (514) to the other execution slices over a result bus (512). A result bus (512) may be a set a physical communication lanes used to transmit information from one execution slice to another. During the transmission time, a specific lane of the result bus (512) may be used by the source execution slice to transmit the result data (514) to any execution slices that may be reading the lane of the result bus (512). The result data (514) on the result bus (512) may not be available to each execution slice at the same time or during the same cycle. Consequently, each execution slice hosting a consumer instruction may calculate the cycle during which the result data (514) will be available to that execution slice on the result bus (512) (using the methods described above).

The result data (514) may be read from the result bus and stored locally on the execution slice if the result data (514) is not immediately needed or will be needed during a subsequent cycle. For example, if a consumer instruction requires the result data (514) from more than one producer instruction, the result data (514) may not be ready during the same cycle. In such a case, the first result data (514) may be stored locally until all necessary result data (514) has been received.

The method of FIG. 5 also differs from the method of FIG. 3, however, in that the method of FIG. 5 further includes using (504) the result data (514) as input for the consumer instruction. Using (504) the result data (514) as input for the consumer instruction may be carried out by performing an operation on the result data (514). For example, a producer instruction of "A+B=C" will proved result data (514) "C" to a consumer instruction "C+D=E". The consumer instruction "C+D=E" uses "C" as input data and performs an ADD operation on "C".

Exemplary embodiments of the present invention are described largely in the context of a fully functional computer system for transmitting data between execution slices of a multi-slice processor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for transmitting data between execution slices of a multi-slice processor, the method comprising:
receiving, by an execution slice, a broadcast message originating from a source execution slice, the broadcast message comprising an instruction tag (ITAG) for a producer instruction, a latency, and a source identifier;
determining that an issue queue in the execution slice comprises an ITAG for a consumer instruction, wherein the consumer instruction depends on result data from the producer instruction;
calculating a cycle countdown using the latency and the source identifier, including:
obtaining a cycle distance between the execution slice and a location identified by the source identifier, the location corresponding to an address of the source execution slice, wherein obtaining the cycle distance comprises dividing a physical distance between the execution slice and the source execution slice by a distance that the result data is able to traverse each cycle, wherein the cycle distance is a non-zero number of cycles required for the result data to travel from the location identified by the source identifier to the execution slice; and
combining the cycle distance and the latency to obtain the cycle countdown;
determining that the cycle countdown has expired; and
in response to determining that the cycle countdown has expired, reading the result data from the producer instruction.

2. The method of claim 1, wherein the cycle countdown is stored in an execution result vector by setting a flag corresponding to a value of the cycle countdown.

3. The method of claim 2, wherein the execution result vector is decremented each cycle by altering a location of the flag corresponding to the value of the cycle countdown.

4. The method of claim 1, wherein determining that the cycle countdown has expired comprises determining that a flag has been set in a ready vector corresponding to the producer instruction.

5. The method of claim 1, wherein the result data is transmitted from the source execution slice using a result bus, and wherein reading the result data from the producer instruction comprises reading the result data from the result bus.

6. The method of claim 1 further comprising:
using the result data as input for the consumer instruction.

7. A multi-slice computer processor for transmitting data between execution slices of a multi-slice processor, the multi-slice computer processor configured for:
receiving, by an execution slice, a broadcast message originating from a source execution slice, the broadcast message comprising an instruction tag (ITAG) for a producer instruction, a latency, and a source identifier;

determining that an issue queue in the execution slice comprises an ITAG for a consumer instruction, wherein the consumer instruction depends on result data from the producer instruction;

calculating a cycle countdown using the latency and the source identifier, including:

obtaining a cycle distance between the execution slice and a location identified by the source identifier, the location corresponding to an address of the source execution slice, wherein obtaining the cycle distance comprises dividing a physical distance between the execution slice and the source execution slice by a distance that the result data is able to traverse each cycle, wherein the cycle distance is a non-zero number of cycles required for the result data to travel from the location identified by the source identifier to the execution slice; and combining the cycle distance and the latency to obtain the cycle countdown;

determining that the cycle countdown has expired; and in response to determining that the cycle countdown has expired, reading the result data from the producer instruction.

8. The multi-slice computer processor of claim 7, wherein the cycle countdown is stored in an execution result vector by setting a flag corresponding to a value of the cycle countdown.

9. The multi-slice computer processor of claim 8, wherein the execution result vector is decremented each cycle by altering a location of the flag corresponding to the value of the cycle countdown.

10. The multi-slice computer processor of claim 7, wherein determining that the cycle countdown has expired comprises determining that a flag has been set in a ready vector corresponding to the producer instruction.

11. The multi-slice computer processor of claim 7, wherein the result data is transmitted from the source execution slice using a result bus, and wherein reading the result data from the producer instruction comprises reading the result data from the result bus.

12. The multi-slice computer processor of claim 7, wherein the multi-slice computer processor is further configured for:

using the result data as input for the consumer instruction.

13. A computing system, the computing system including a multi-slice computer processor for transmitting data between execution slices of a multi-slice processor, the multi-slice computer processor configured for:

receiving, by an execution slice, a broadcast message originating from a source execution slice, the broadcast message comprising an instruction tag (ITAG) for a producer instruction, a latency, and a source identifier;

determining that an issue queue in the execution slice comprises an ITAG for a consumer instruction, wherein the consumer instruction depends on result data from the producer instruction;

calculating a cycle countdown using the latency and the source identifier, including:

obtaining a cycle distance between the execution slice and a location identified by the source identifier, the location corresponding to an address of the source execution slice, wherein obtaining the cycle distance comprises dividing a physical distance between the execution slice and the source execution slice by a distance that the result data is able to traverse each cycle, wherein the cycle distance is a non-zero number of cycles required for the result data to travel from the location identified by the source identifier to the execution slice; and combining the cycle distance and the latency to obtain the cycle countdown;

determining that the cycle countdown has expired; and in response to determining that the cycle countdown has expired, reading the result data from the producer instruction.

14. The computing system of claim 13, wherein the cycle countdown is stored in an execution result vector by setting a flag corresponding to a value of the cycle countdown.

15. The computing system of claim 14, wherein the execution result vector is decremented each cycle by altering a location of the flag corresponding to the value of the cycle countdown.

16. The computing system of claim 13, wherein determining that the cycle countdown has expired comprises determining that a flag has been set in a ready vector corresponding to the producer instruction.

17. The computing system of claim 13, wherein the result data is transmitted from the source execution slice using a result bus, and wherein reading the result data from the producer instruction comprises reading the result data from the result bus.

* * * * *